(12) United States Patent
Nishigaki et al.

(10) Patent No.: US 6,798,534 B1
(45) Date of Patent: Sep. 28, 2004

(54) IMAGE PROCESSING DEVICE

(75) Inventors: Junji Nishigaki, Toyokawa (JP);
Yoshihiko Hirota, Toyokawa (JP);
Nobuhiro Mishima, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/539,891

(22) Filed: Mar. 31, 2000

(30) Foreign Application Priority Data

Apr. 5, 1999 (JP) .......................................... 11-098057

(51) Int. Cl.⁷ .............................................. G06F 15/00
(52) U.S. Cl. ...................... 358/1.16; 358/1.9; 358/1.15; 358/296; 358/448; 358/518; 382/162; 382/167
(58) Field of Search ............................... 358/1.16, 1.15, 358/1.9, 296, 518, 448; 382/162, 167, 169, 284, 309

(56) References Cited

U.S. PATENT DOCUMENTS 5,224,181 A * 6/1993 Tsutsumi ..................... 382/284
5,699,169 A 12/1997 Nakatani et al. ........... 358/3.07
6,452,969 B1 * 9/2002 Yim ....................... 375/240.02

FOREIGN PATENT DOCUMENTS

JP 10-28210 1/1998

* cited by examiner

Primary Examiner—Twyler Lamb
(74) Attorney, Agent, or Firm—McDermott Will & Emery (57) ABSTRACT

An image forming apparatus comprising a buffer memory for storing image data, a printer unit for printing based on image data output from the buffer memory, a compression unit for compressing image data output from the buffer memory to generate compression data, a hard disk for storing the compression data compressed by the compression unit, and output unit for outputting compression data from the hard disk to the buffer memory, and an expansion unit for expanding the compression data output from the buffer memory and outputting the expansion data to the printer unit. When printing multiple copies, image data are highly compressed and stored on a hard disk, and output directly to a buffer memory in a highly compressed state. Thereafter, the data are expanded and transmitted to the printer. As a result, multiple copy printing is accomplished at high speed.

8 Claims, 8 Drawing Sheets

IMAGE PROCESSING DEVICE

RELATED APPLICATIONS

This application is based on Patent Application No. 11-98057 filed in Japan, the entire content of which is hereby incorporated by reference.

BACKGROUND OF THE INVENTION

1. Field of the Invention

The present invention relates to an image forming apparatus for forming a plurality of images using image data recorded in a memory unit.

2. Description of the Related Art

In image forming apparatuses such as printers, digital copiers, facsimile machines and the like, the timing is individually controlled for image data input and operation of the printing unit to improve the printing productivity. For this reason, the input image data are temporarily stored in a page buffer memory, and subsequently read out with a suitable timing and output to the printer unit.

In color image forming apparatuses, yellow (Y), magenta (M), cyan (C), and black Bk color images or superimposed over another in order to form a full color image, and the image data of each color must be output to the printer unit with a suitable timing to prevent image drift of each color image. For this reason, the image data of each color are temporarily stored beforehand in a page buffer memory so as to control the readout and output with a suitable timing. In response to the demand to form image in a short time, some tandem-type color image forming apparatuses simultaneously store Y, M, C, Bk color image data in the page buffer memory beforehand, and read out the image data of each color with near simultaneity to form images in parallel.

When printing a plurality of copies, image data input from a scanner or printer controller are stored in a storage device such as a hard disk to eliminate re-input of the image data. Image data sequentially read out from this storage device in accordance with a print command are temporarily stored in a page buffer memory, and subsequently read out from the page buffer memory with a suitable timing and output to the printer unit.

The image data are compressed at a high compression ratio when stored on the hard disk to allow storage of many hundreds of pages. At the same time, this high compression ratio is achieved using a compression method that does not allow an editing process while in the compressed state (e.g., variable length compression method, JPEG compression method). The variable length compression method is discussed later. A description of the JPEG compression method is omitted since this method conforms to the ISO/IEC standard 10918. When image data are compressed at a low compression ratio, the capacity of the hard disk must be increased, with a resulting increase in cost. A further disadvantage is the long time necessary for writing to and reading from the hard disk.

The image editing process (e.g., rotation, N-in-1 for compressing N document sheets for output on a single sheet and the like) is conventionally performed on the image data stored in the page buffer memory. Therefore, the image data stored in the page buffer memory must be stored in an editable form. For this reason, the compressed image data must be expanded when transferred from the hard disk to the page buffer memory.

This expansion of the compressed image data requires a long time. Therefore, a long time is required for the transfer of the image data from the hard disk to the page buffer memory, and this process becomes a bottleneck which reduces the overall printing productivity.

SUMMARY OF THE INVENTION

An object of the present invention is to eliminate the previously described disadvantages.

A further object of the present invention is to provide an image forming apparatus of improved print productivity when printing a plurality of copies.

A still further object of the present invention is to provide an image forming apparatus capable of transferring data from a hard disk to a page buffer memory in a short time without reducing the compression ratio of the data written to the hard disk.

These and other objects are attained by an image forming apparatus having a buffer memory for storing image data, a printer unit for printing based on image data output from the buffer memory, a compression unit for compressing image data output from the buffer memory to generate compression data, a hard disk for storing the compression data compressed by the compression unit, an output means for outputting compression data from the hard disk to the buffer memory, and an expansion unit for expanding the compression data output from the buffer memory and outputting the expansion data to the printer unit.

The objects of the present invention are further attained by an image forming apparatus having a reception unit for receiving image data, a first compression unit for performing a first compression of received image data, an editing unit for editing based on the first compression data compressed by the first compression unit, a buffer memory for storing the edited first compression data, a first output unit for outputting to a printer unit the first compression data output from the buffer memory, a second compression unit for performing a second compression on the first compression data output from the buffer memory, a hard disk for storing the second compression data compressed by the second compression unit, a second output unit for outputting the second compression data from the hard disk to the buffer memory, and an expansion unit for expanding the second compression data output from the buffer memory and outputting the expanded data to the printer unit.

The invention itself, together with further objects and attendant advantages will be best understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

A tandem-type digital color copier (image forming apparatus) is described below. This color copier is also usable as a printer connected to a computer.

Figure 1:
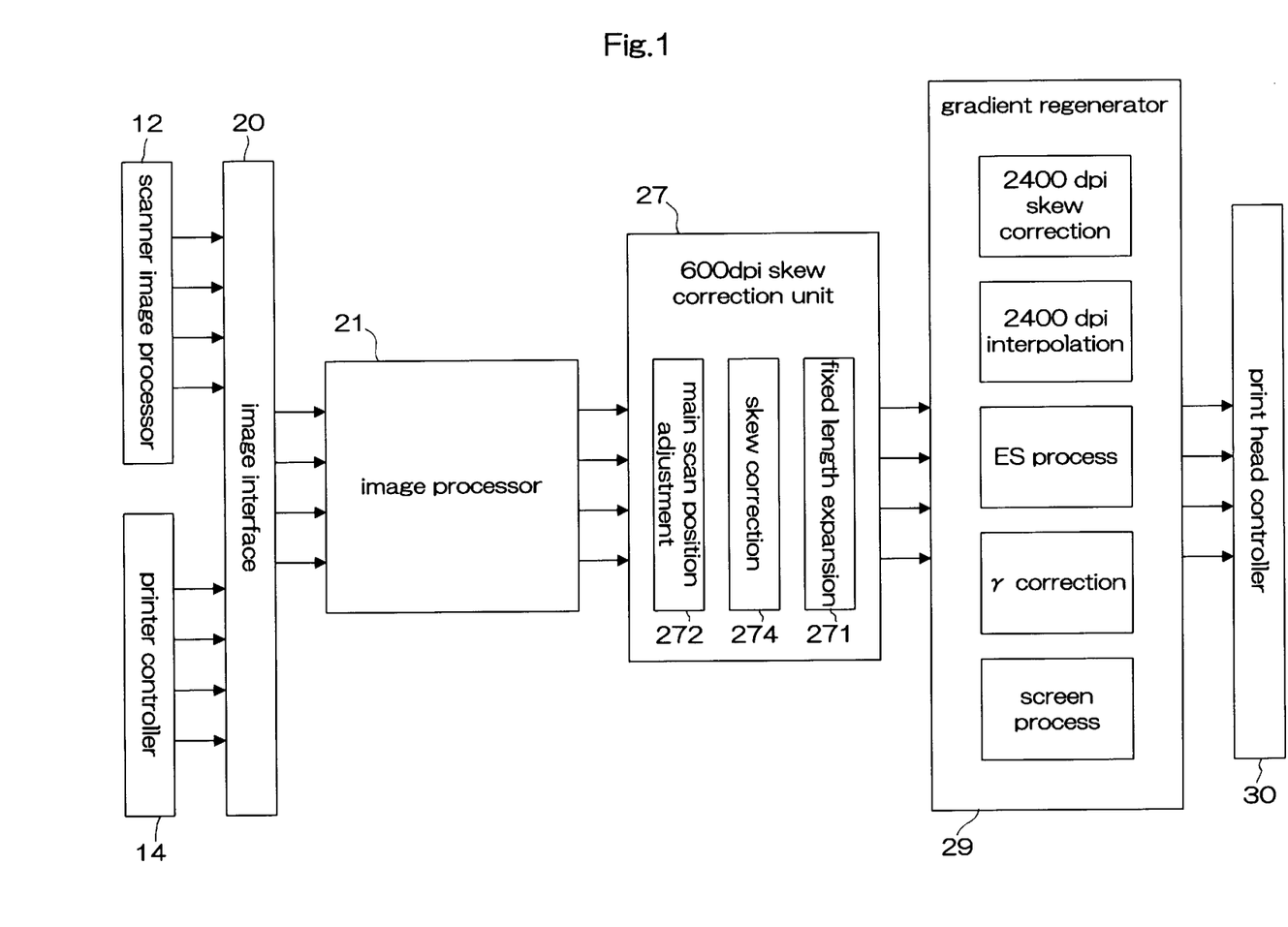
FIG. 1 is a block diagram showing an image forming apparatus.
Figure 8:
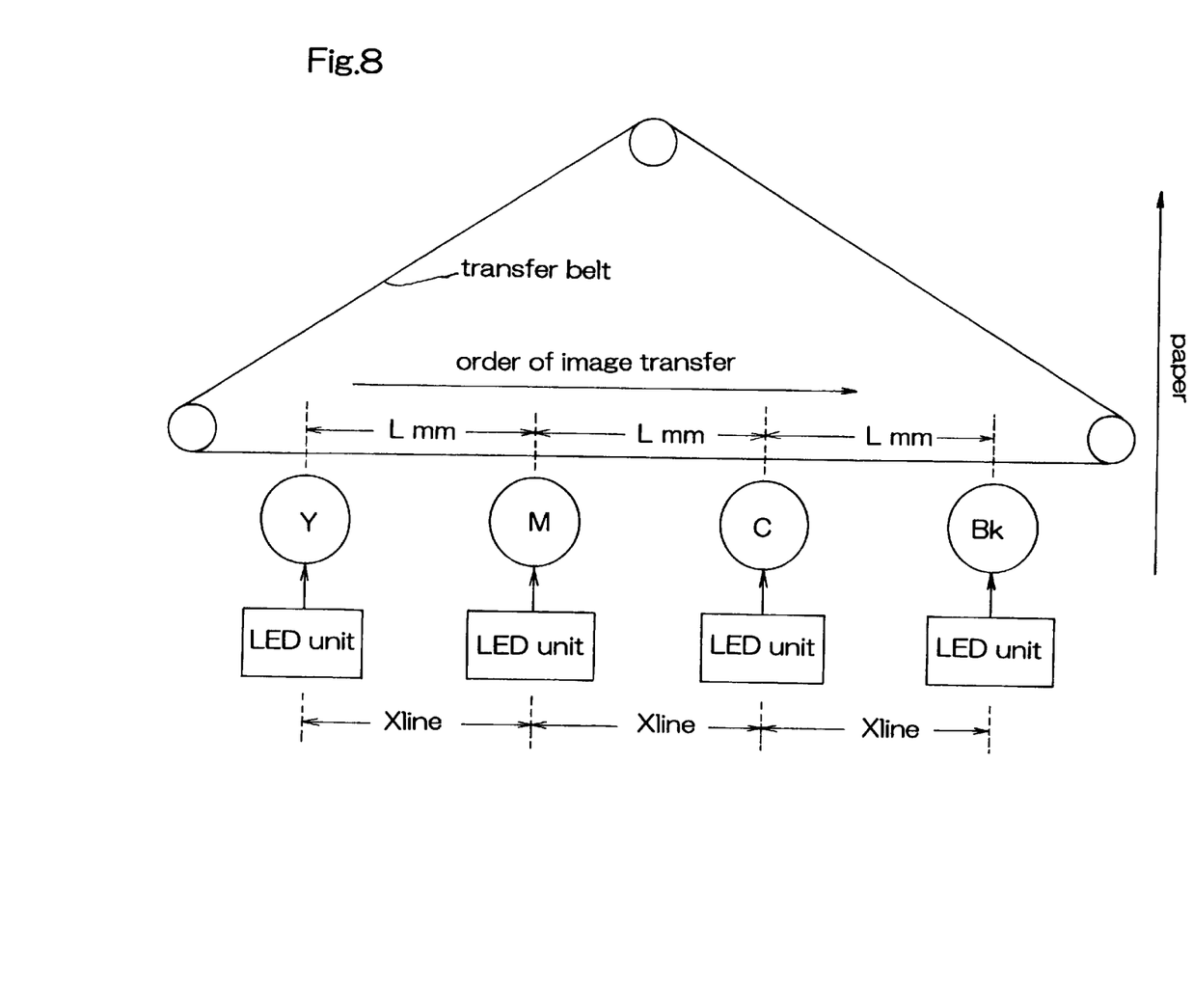
FIG. 8 is a system structural view of the image forming apparatus.

FIG. 1 is a block diagram showing the structure of the digital color copier. FIG. 8 illustrates the image forming system of the digital color copier.

As shown in FIG. 8, the copier is a tandem-type image forming system using an electrophotographic process to output Y, M, C, Bk color images onto a transfer belt, and transfer these images onto a paper sheet with near simultaneity. Image forming unit of each color Y, M, C, Bk (i.e., a unit comprising a photoconductive drum (PC), developing device, LED array and the like) are provided at equal spacing (K mm in the example of the drawing) along the transfer belt.

The image data of each color Y, M, C, Bk are sent to the print head, and processed in parallel. That is, when image data are transmitted from the scanner image processor 12, the image data of each color Y, M, C, Bk generated by a single scanning operation are simultaneously input to the image processor 21 via the image interface 20. The image data sent from the printer controller 14 are subjected to raster image processor (RIP) development and the resulting Y, M, C, Bk color image data are simultaneously input to the image processor 21 via the image interface 20.

The image forming units corresponding to each color are arranged at equal spacing in the direction of travel of the transfer belt in the sequence Y, M, C, Bk. The timing of the development of each color Y, M, C, Bk is delayed only by a time equivalent to the aforesaid spacing. As a result, toner of each color Y, M, C, Bk is overlaid on the transfer belt without color shift. That is, the image forming timing of each color Y, M, C, Bk is controllably delayed sequentially only by a time corresponding to the aforesaid spacing.

Since the electrostatic image of each color is formed on the charged surface of the photoconductive drive of the respective colors Y, M, C, Bk via scanning by four individual LED heads, color shift is generated when there is skewing caused by a shifting of the print start position in the main scan direction, or shifting of the degree of parallelism of the LED head and the photoconductive drum. Therefore, color shift is prevented by subjecting the image data of each color Y, M, C, Bk to position correction and image correction.

The flow of the image data is described below. The CPU which executes data processing and various types of settings is not shown in the drawing.

The Y, M, C, Bk image data transmitted from the scanning image processor 12 or the print controller 14 are input to the image processor 21 via the image interface 20.

Figure 2:
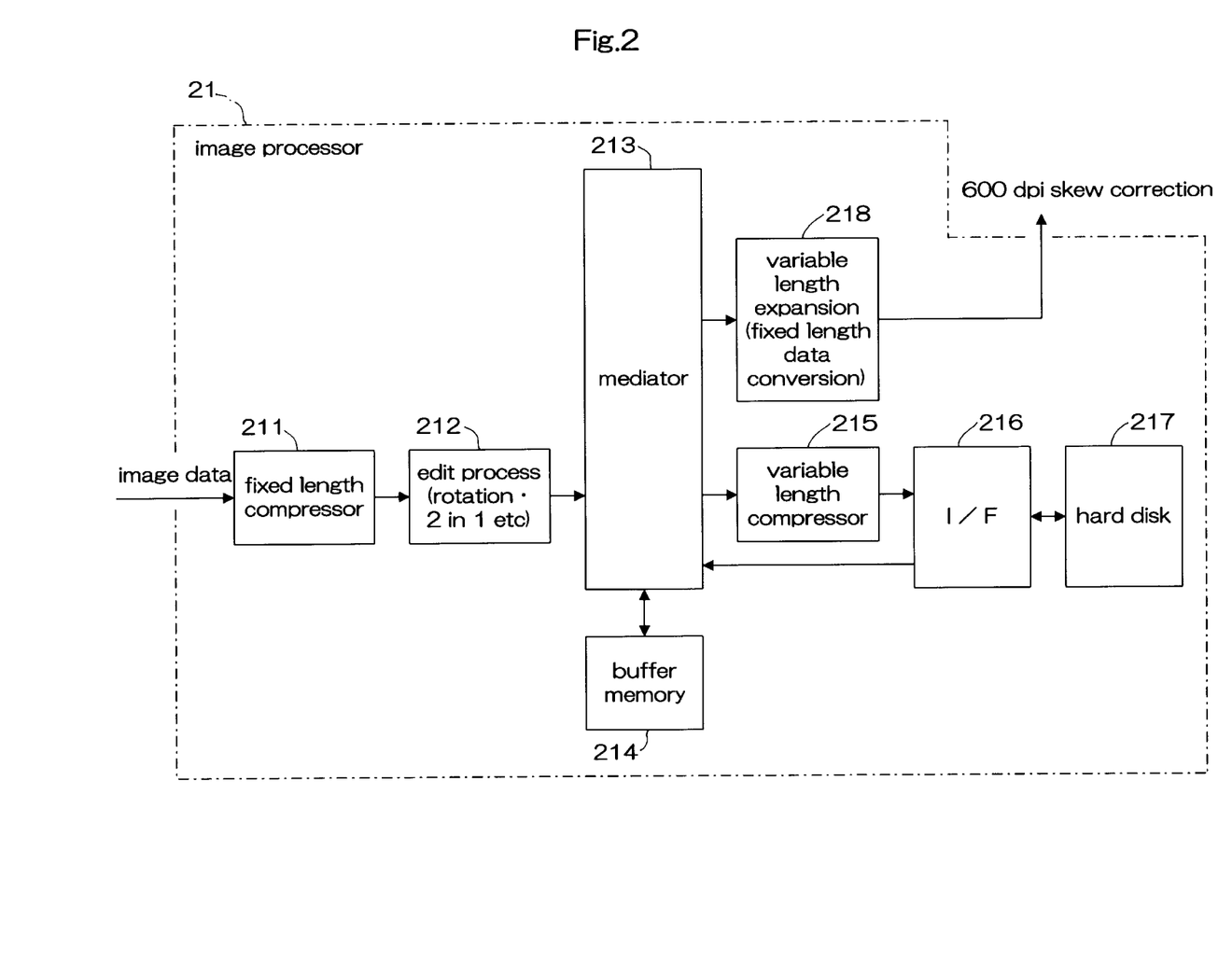
FIG. 2 is a block diagram showing an image processor.

The structure of the image processor 21 is shown in FIG. 2. In the image processor 21, first, 4×4 pixel blocks are sequentially cut out of the input image data by a block generator not shown in the drawing. Each block is subjected to a fixed length compression process via the GBTC method by a fixed length compressor 211 to generate 48-bit fixed length code per each block. This fixed length compression process is described later. The fixed length code is then subjected to an editing process (i.e., an image rotation process, N-in-1 process (a process for compressing N number of document sheets for output on a single sheet)) corresponding to the set edit mode. In this way the generated fixed length code or the edited fixed length code is stored in a page buffer memory 214 by a mediator 213. The page buffer memory 214 is a memory having a storage capacity sufficient to accommodate one page of fixed length code.

When a print command from the printer unit is detected, the mediator 213 determines whether this print command is a single document copy print command, or a first copy print command for multiple copies, or a second or subsequent print command for multiple copies.

As a result, when the print command is a single copy print command, the fixed length code stored in the page buffer memory 214 is output to the 600 dpi skew correction unit 27. That is, the fixed length code is fed through a fixed length data converter 218 (hereinafter, when the CODESEL is set at [1]), and output to the 600 dpi skew converter 27. In this way the block is processed after skew correction by the 600 dpi skew converter 27. This process is described later.

When the print command is a first copy print command for multiple copies, the fixed length code stored in the page buffer memory 214 is fed through the fixed length data converter 218 and output to the 600 dpi skew correction unit 27, and output to the variable length compressor 215. In the variable length compressor 215, the fixed length code of each block is compressed in accordance with the attributes of each block. The variable length compression process is described later. The variable length code compressed by the variable length code compressor 215 is stored on the hard disk 217 via the interface 216. The amount of data of the variable length code is a relatively small since the data are in a highly compressed state, such that the time required to write the data to the hard disk 217 is a relatively short time.

When the print command is a second or subsequent print command for multiple copies, the variable length compression code stored on the hard disk 217 is read out via the interface 216, and temporarily stored in the page buffer memory 214. Since the variable length compression code is stored directly in the page buffer memory 214 without expansion of the variable length compression code, the time required for data transfer is a relatively short time. The variable length compression code stored in the page buffer memory 214 is then processed by the fixed length data converter (decoder, variable length expander) 218 (hereinafter, when the CODESEL is set at [0])). That is, the variable length compression code is decoded by the fixed length data converter 218 to fixed length code (code of 48-bits per block) before variable length compression. In other words, the variable length compression code is subjected to inverse variable length compression (variable length expansion). The variable length expansion process is described later. The data decoded to the original fixed length code via variable length expansion by the fixed length data converter 218 are output to the 600 dpi skew correction unit 27.

The data processed by the image processor 21 is subjected to various processing by the 600 dpi skew correction unit 27, including main scan position adjustment process 272, skew correction process 274, and fixed length expansion process 271. Before input to the 600 dpi skew correction unit 27, the output timing is adjusted for each color in the subscan direction, and a subscan delay control process is executed to compensate color shift and spacing L of the image forming units of each color.

The main scan position adjustment 272 controls the readout timing from the internal memory so as to align the different standard positions (center position) in the main scan direction according to sheet size with the center position of the transfer belt. The subscan direction skew correction 274 controls the readout timing from the internal memory so as to shift the line of a predetermined number of pixels determined by the degree of skewing. The degree of skew is detected by measuring the amount of shift corresponding to the Bk component when test patterns of each color are overlaid on the transfer belt. Measurement of the degree of skew is accomplished using sensors not shown in the drawings provided downstream from the Bk image forming unit. The fixed length expansion process 271 is an inverse conversion process of the fixed length compression process. The fixed length expansion process 271 regenerates the image data from the compressed data of each color Y, M, C, Bk, and transmits the restored image data to the gradient regenerator 29. The fixed length expansion process is described later.

In the gradient regenerator 29, each color is subjected to a resolution conversion process to 2400 dpi, and thereafter gradient distortion is corrected by the gamma characteristics in the electrophotographic process, ands the corrected color image data are transmitted to the respective LED driver corresponding to the print head controller 30. Before gamma correction, image edge detection is again performed, and text edge areas are given resolution priority, and subjected to intensity modulation of 1-dot period. The continuous gradient areas are given gradient regeneration priority, and subjected to intensity modulation of 2-dot period. At this time, in the 2-dot intensity modulation, a different screen angle is set for each color to improve image graininess.

The fixed length compression process executed by the fixed length compressor 211 is described below with reference to FIG. 3. The variable length compression process executed by the variable length compressor 215 is described with reference to FIG. 4. The fixed length data conversion (variable length expansion) process executed by the fixed length data converter 218 is described with reference to FIGS. 5 and 6. The fixed length expansion process executed by the fixed length expansion processor 271 is described with reference to FIG. 7.

1. Fixed length compression process (FIG. 3)

First, blocks of 4×4 pixel per block are cut out from the raster data of the 8-bit per pixel image of each color via a block generator not shown in the drawing. The cut out block comprises 8×4×4=128 bits, and is transmitted to the fixed length compressor 211.

Figure 3:
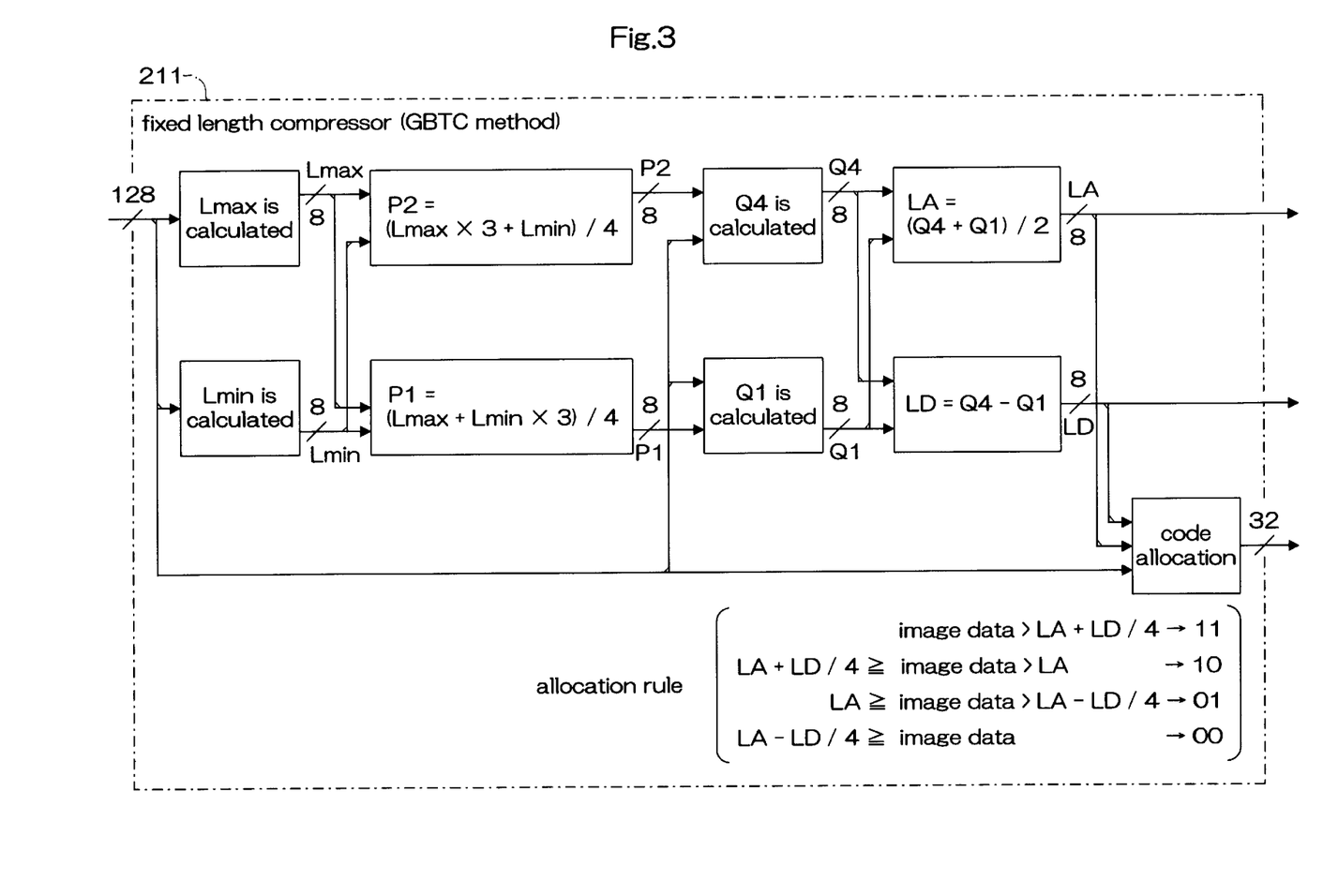
FIG. 3 is a block diagram showing a fixed length compressor.

In the fixed length compressor 211 shown in FIG. 3, the 128-bit data are compressed by the GBTC method, and converted to 48-bit compression data. The maximum value Lmax and minimum value Lmin are detected in the 4×4 pixel image data.

Then, the internal points P2 and P1 are calculated based on the detected maximum and minimum values. The internal point P2 is an internal point dividing the gradients between maximum and minimum values at a ratio 3:1, and is calculated via equation (1) below; the internal point is inward from the maximum value Lmax. The internal point P1 is an internal point dividing the gradients between maximum and minimum values at a ratio 1:3, and is calculated via equation (2) below; the internal point is inward from the minimum value Lmin.

$$P2=(Lmax\times 3+Lmin)/4 \quad (1)$$

$$P1=(Lmax+Lmin\times 3)/4 \quad (2)$$

Then, the upper limit value Q4 is calculated via equation (3) below based on the calculated internal point P2, and the lower limit value Q1 is calculated via equation (4) below based on the internal point P1.

$$Q4=(\text{average value of image data P2 and greater}) \quad (3)$$

$$Q1=(\text{average value of image data P1 and below}) \quad (4)$$

Then, the average value index LA of the block is calculated via equation (5) below based on the calculated upper limit value Q4 and lower limit value Q1, and similarly, the gradient width index LD of the block is calculated via equation (6) below based on the upper limit value Q4 and the lower limit value Q1.

$$LA=(Q4+Q1)/2 \quad (5)$$

$$LD=(Q4-Q1) \quad (6)$$

Then, the data value of each pixel is quantified according to the rules of equations (7)–(10) below based on the relationship of the data value of each pixel and the average value index LA and the gradient width index LD, so as to allocate a 2-bit code for each pixel.

$$\text{Data value} > LA + LD/4 \rightarrow 11 \quad (7)$$
$$LA + LD/4 \geq \text{data value} > LA \rightarrow 10 \quad (8)$$
$$LA \geq \text{data value} > LA - LD/4 \rightarrow 01 \quad (9)$$
$$LA - LD/4 \geq \text{data value} \rightarrow 00 \quad (10)$$

The 4×4×8 bit=128-bit image data comprises 8-bit LA, 8-bit LD, and 2-bits per pixel 4×4 pixel 32-bit quantization code, and is compressed to a total of 48-bit fixed length data by the previously described process.

In the fixed length compression process, the interior points on the high density side and the low density side are calculated from the maximum value and minimum value, and the average value between the maximum value and the high density side interior point is designated the upper limit index, and the average value between the minimum value and the low density side interior point is designated the lower limit index. For this reason, the hardware construction for determining the upper limit index and the lower limit index is disadvantageously complex, and power consumption is disadvantageously great. Furthermore, gradient reproducibility is disadvantageously reduced due to the compression of the upper and lower dynamic range of the present image. In order to avoid these disadvantages, for example, the fixed length compression process may entail using an intermediate value between the maximum value minimum value of the image, and the average value of the image may be used, setting the maximum value of the image as an upper limit index and setting the high density of (average value−intermediate value)/2 from the minimum value of the image as the lower limit index when the average value is greater than the intermediate value, and setting the minimum value of the image as a lower limit index and setting the low density of (intermediate value−average value)/2 from the maximum value of the image as the upper limit index when the average value is less than the intermediate value. According to this process, the hardware construction can be simplified and spike noise prevented near the upper and lower ends of the dynamic range while broadening the dynamic range.

2. Variable length compression process (FIG. 4)

The variable length compressor 215 executes a compression process by first determining the attribute of each block by the attribute discriminator 2150, and converting the code length to either 2-bit/2-bit/10-bit/50-bit in accordance with the discrimination result.

Figure 4:
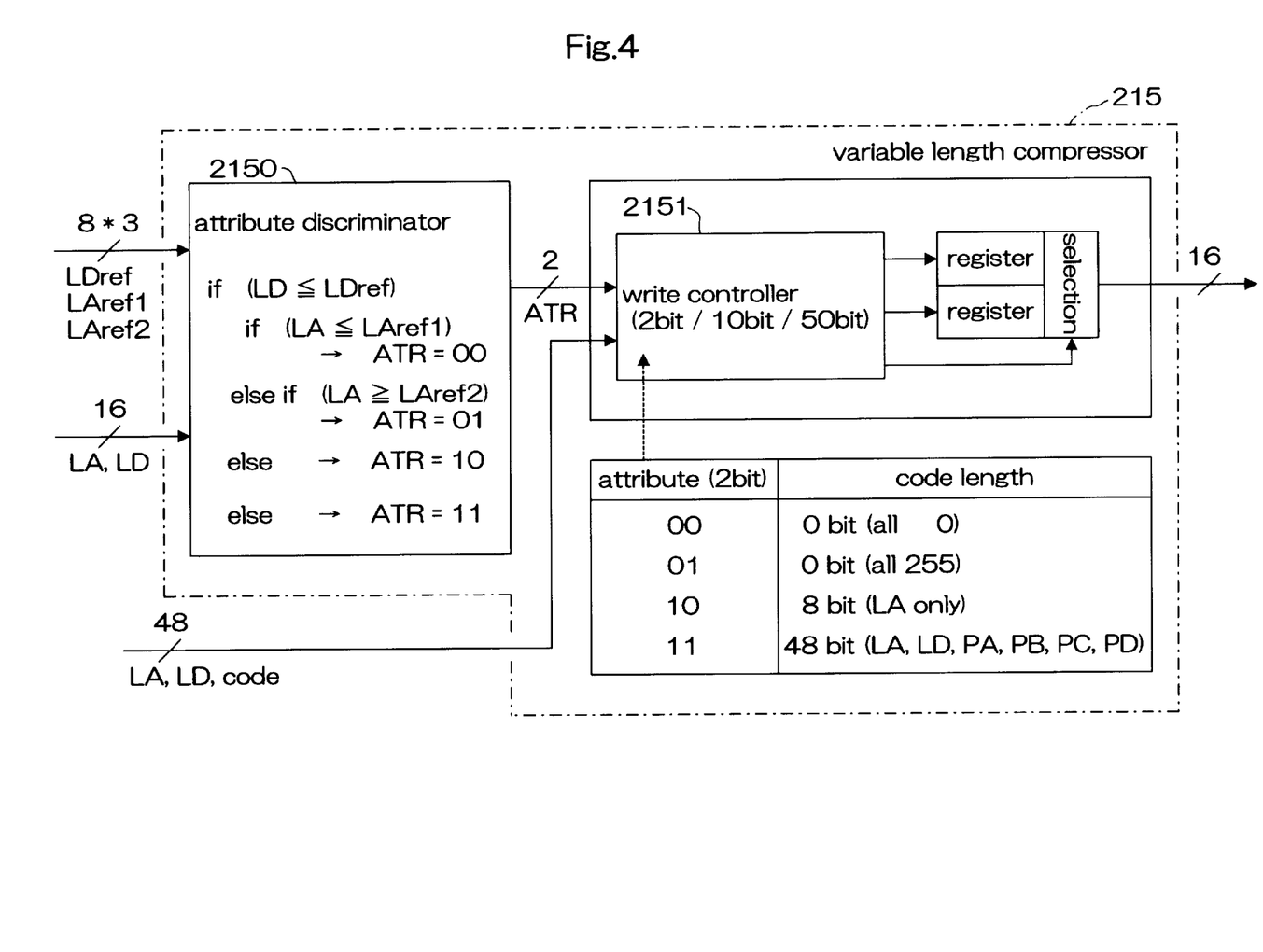
FIG. 4 illustrates a variable length compressor.

As shown in FIG. 4, in the attribute discriminator 2150, the attribute of each 4×4 pixel block is determined ac cording to rules built in the attribute discriminator 2150 based on the average value index LA and the gradient width index LD, and a 2-bit attribute code is generated for each block in accordance with the discrimination result.

(a) When LD is less than the gradient width reference value LDref and LA is less than the average value first reference value LAref1, there is minimal gradient difference within the block and the density level is low (near zero), and the attribute information ATR is set at [00].

(b) When LD is less than the gradient width reference value LDref and LA is equal to or greater than the average value second reference value LAref2, there is minimal gradient difference within the block and the density level is high (near 255), and the attribute information ATR is set at [01].

(c) When LD is less than the gradient width reference value LDref and LA is equal to or greater than the average value first reference value LAref1 and less than the average value second reference value LSref2, there is minimal gradient difference within the block and the density level is near intermediate (near the density of the average value index LA), and the attribute information ATR is set at [10].

(d) At other times, i.e., when LD is equal to or greater than the gradient width reference value LDref, there is a large gradient difference within the block, and the attribute information ATR is set at [11].

The three reference values LDref, LAref1 and LAref2 determined above are values set in an internal register from the CPU, and have the meanings described below. By setting these three reference values (two types of reference values in the ace of LAref1) at suitable values, the compression ratio of the variable length code compression can be adjusted in consideration of image quality and balance. Furthermore, one or more of these reference values may be switched in accordance with the image data classification (i.e., classifications such as an image input from a scanner which generated much noise, and an image generated by a computer which produces scant very little noise), and in such a case an optimum image can be obtained in accordance with the image data classification.

(a) Gradient width reference value LDref: used to determine the magnitude of the gradient difference. When LDref is set a large value, instances of [ATR=11] decrease, the number of blocks without a gradient difference increases, and the number of blocks with a gradient difference decreases. When LDref is set a small value, instances of [ATR=11] increase, the number of blocks without a gradient difference decreases, and the number of blocks with a gradient difference increases.

(b) Average value first reference value LAref1: used to determine blocks with low density level. When LAref1 is set at a large value, instances of [ATR=00] increase.

(c) Average value second reference value LAref2: used to determine blocks with high density level. When LAref2 is set at a low value, instances of [ATR=01] increase.

The write controller 2151 executes processing in accordance with the attribute discrimination result.

First, the data of each 4×4 pixel block are converted in accordance with the rules shown in the lower right box in FIG. 4, in accordance with the value of the attribute information ATR input from the attribute discriminator 2150.

(a) [ATR=00] blocks are converted to only 2-bit attribute information [00].

(b) [ATR=01] blocks are converted to only 2-bit attribute information [01].

(c) [ATR=10] blocks are converted to 10-bit data comprising the 2-bit attribute information [10] and 8-bit average value index LA.

(d) [ATR=11] blocks are converted to 50-bit data comprising the 2-bit attribute information [11] and 48-bit fixed length compression data.

In accordance with the attribute information ATR value, the variable length compression data converted from the 48-bit fixed length compression data to either the 2-bit attribute information, or the 10-bit data comprising the 2-bit attribute information and 8-bit average value index LA, or 50-bit data comprising 2-bit attribute information and 48-bit fixed length compression data are stored in an internal register as shown in to top right box in FIG. 4, and thereafter serially converted and output so as to conform to a 16-bit data pass.

3. Variable length expansion process (FIGS. 5 and 6)

Figure 5:
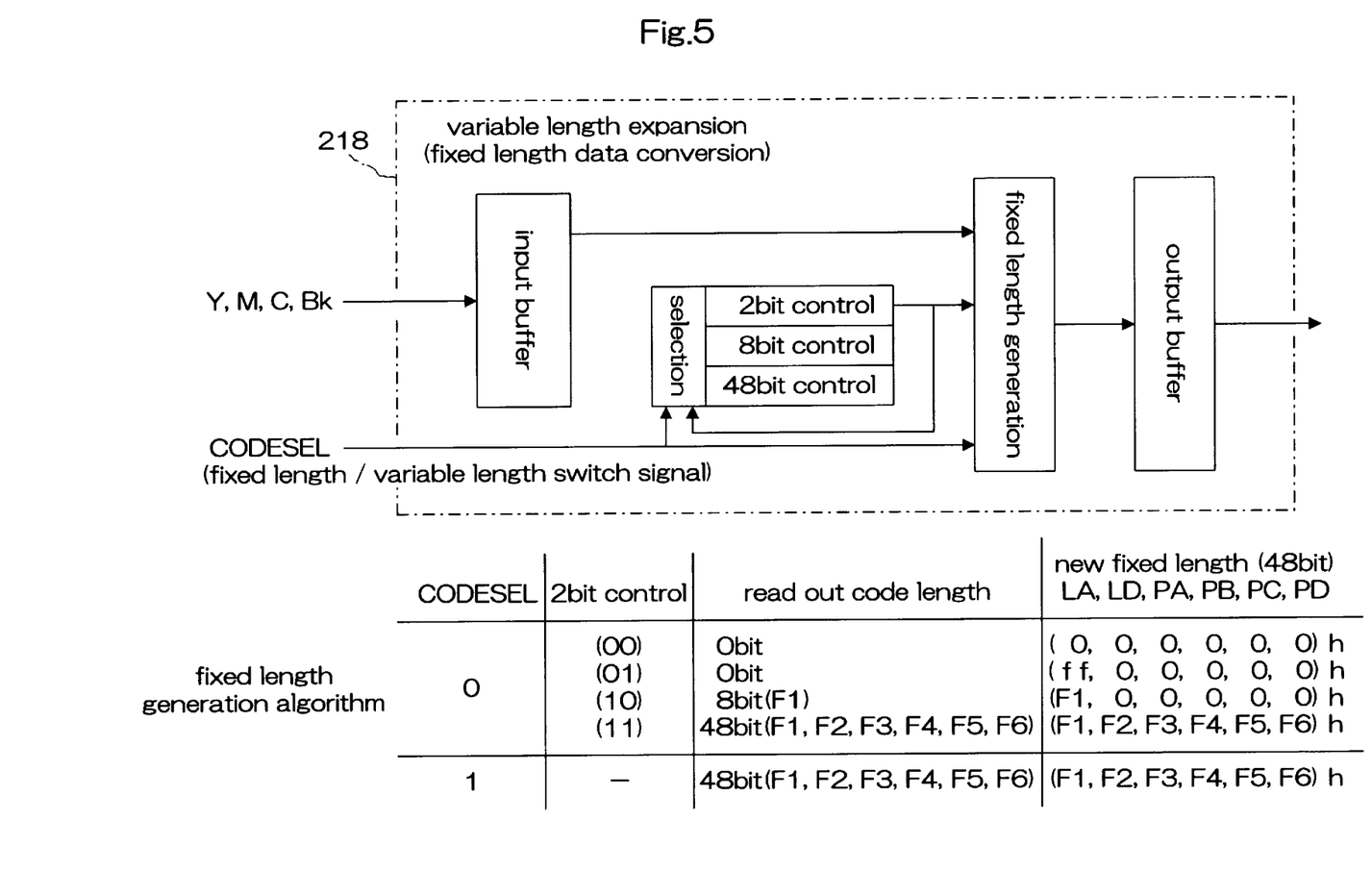
FIG. 5 illustrates a fixed length data converter (variable length code expander)
Figure 6:
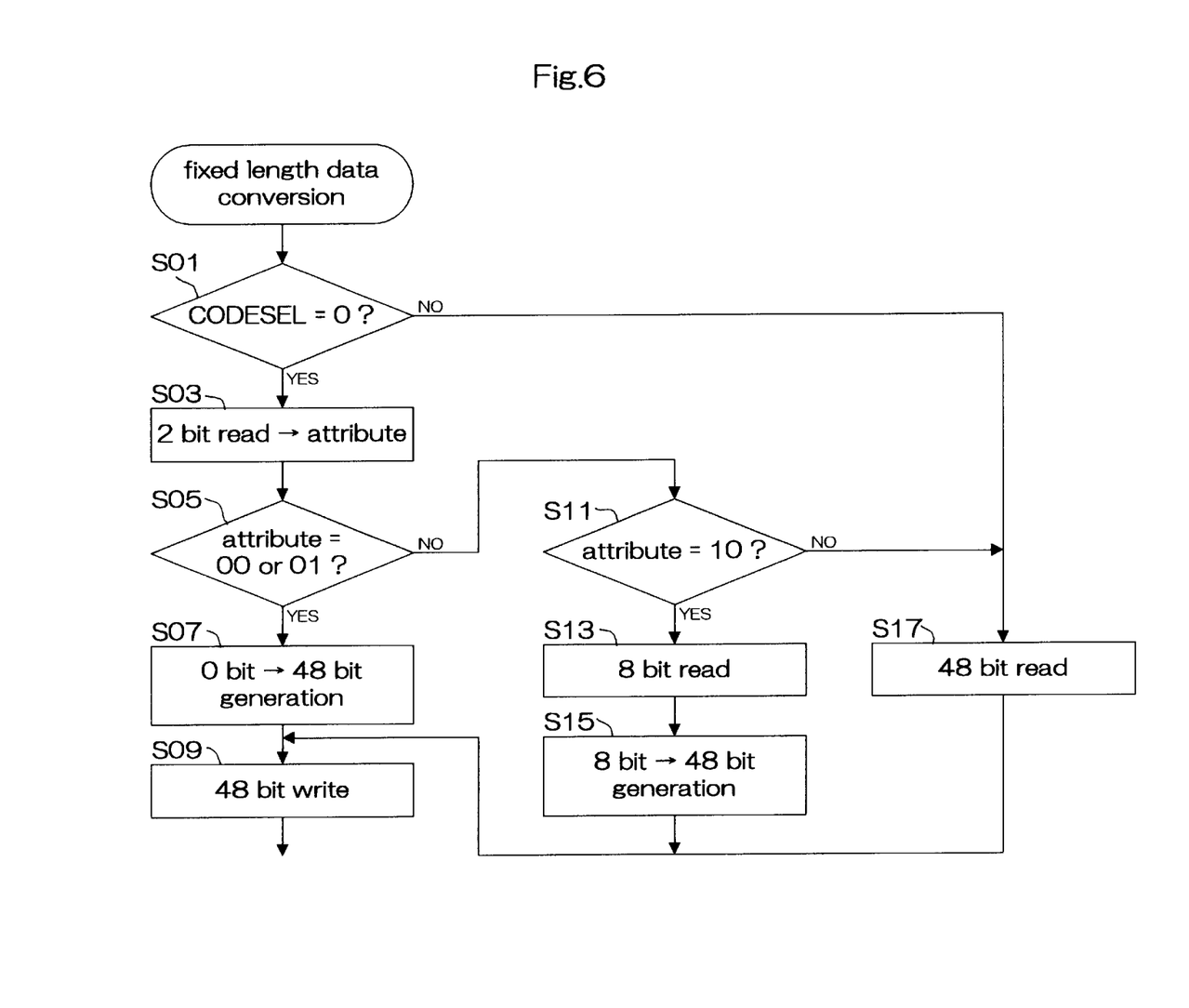
FIG. 6 is a flow chart of the processing performed by the variable length code expander.

FIGS. 5 and 6 show the process of converting the variable length compression data read out from the page buffer memory 214 by the mediator 213 to fixed length compression data of 48-bit per 4×4 pixel. This process is an inverse conversion of the variable length code compression process, i.e., a variable length code expansion process.

When the CODESEL (a fixed length/variable length switch signal for switching the feed out through the fixed length data converter 218 or executing the processing by the fixed length data converter 218) from the CPU is [0], the print command is a second or subsequent copy print command of multiple document copies. That is, when the variable length compression code is stored in the page buffer memory 214. Accordingly, in this case the variable length code expansion process is executed in accordance with the fixed length generation algorithm shown in the top box within the bottom section of FIG. 5.

That is, processing is executed to generate 48-bit data and write the data to the output buffer in accordance with an algorithm corresponding to the value of the 2-bit attribute information ATR read from the input buffer.

(a) When attribute information ATR=[00], 48-bit data are generated such that average value index LA=0h, gradient width index LD=0h, and code information=0000h.

(b) When attribute information ATR=[01], 48-bit data are generated such that average value index LA=ffh, gradient width index LD=0h, and code information=0000h.

(c) When attribute information ATR=[10], the 8-bit data F1h from the 2-bit attribute data are designated the average value index LA, and 48-bit data are generated such that [LA=F1h], gradient width index LD=0h, and code information=0000h.

(d) When attribute information ATR=[11], the 48-bit data from the 2-bit attribute information are directly generated as new fixed length compression data.

On the other hand, when the fixed length/variable length switch signal CODESEL from the CPU is [1], the print command specifies only one copy of a document, or the print command specified the first copy of multiple printings of a document. That is, the fixed length code is stored in the page buffer memory 214. Accordingly, in this case, the data transmitted from the page buffer memory 214 to the input buffer are written directly to the output buffer, as shown in the bottom box in the bottom section in FIG. 6.

4. Fixed length expansion process (FIG. 7)

Figure 7:
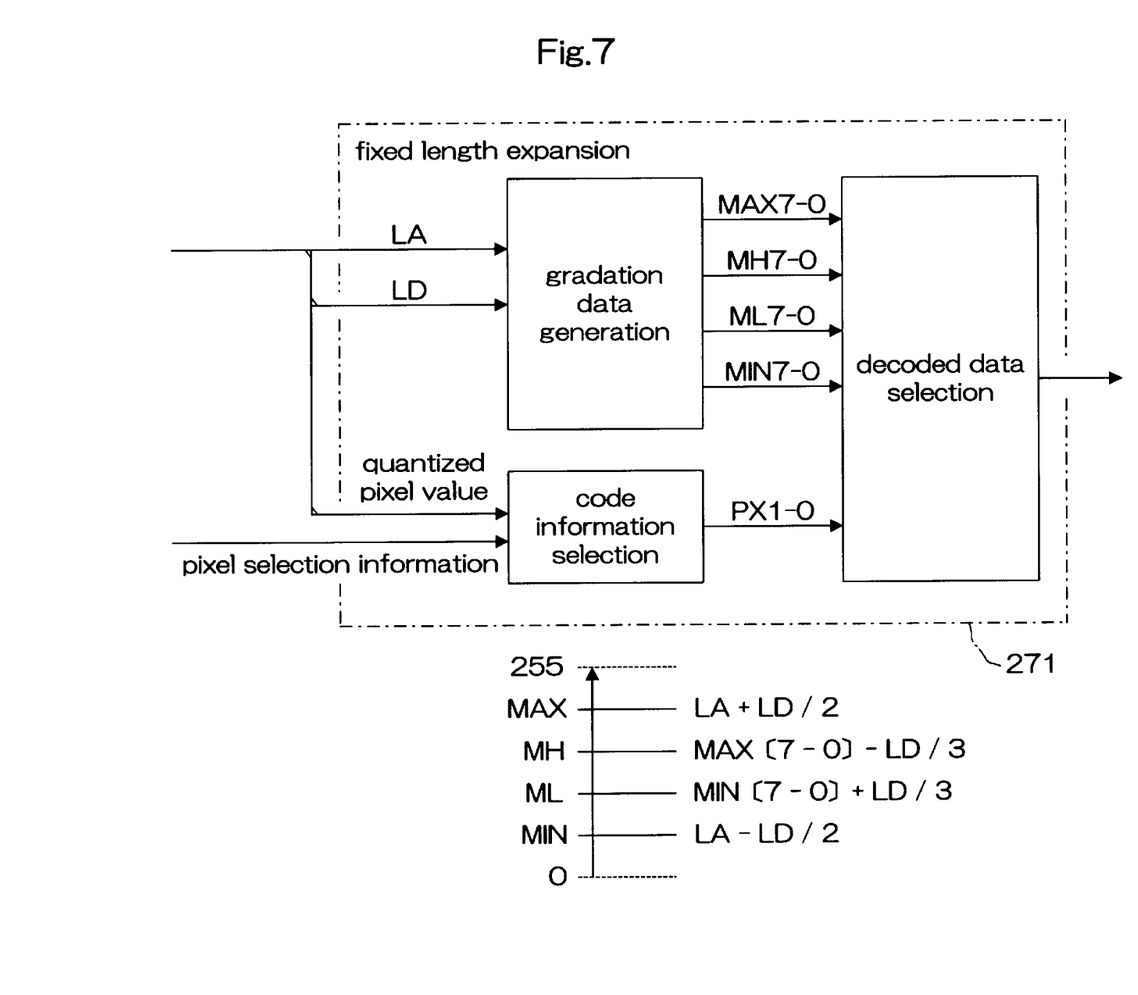
FIG. 7 illustrates a fixed length expander.

The data (fixed length code) output from the image processor 21 are subjected to a fixed length expansion process (inverse conversion of fixed length compression) by the fixed length expander 271 shown in FIG. 7. That is, each pixel value within a 4×4 pixel block is determined among 256 gradients based on the 2-bit quantized pixel value, average value index LA, and gradient width index LD. An example of the rule of regenerating the 250 gradients is shown at the bottom section of FIG. 7. In this way, the image data regenerated to 256 gradients are output for the printing operation.

In the above description, since a fixed length compression process is a prerequisite, variable length compression code is stored on a hard disk based on the attribute discrimination result, and this variable length compression code is output directly to the page buffer memory 214. However, similar effectiveness is attained even when JPEG compression data are similarly stored on a hard disk, and directly transferred to the page buffer memory 214. In the case of JPEG compression, the fixed length compressor 211 and edit process 212 of FIG. 2 are eliminated, and the variable length compressor 215 is changed to JPEG compression, and the variable length expansion (fixed length data conversion) 218 is changed to JPEG expansion.

As described above, since compression code are stored in a memory device at a high compression ratio and the compression code are transmitted to the page buffer memory without expanding the compression code, the data transfer from the memory device to the page buffer memory can be accomplished in a short time without reducing the compression ratio of the data stored in the memory device. As a result, print productivity is improved.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing device for storing image data in a buffer memory and outputting image data stored in the buffer memory and outputting image data stored in the buffer memory for printing, said image processing device comprising:

a non-volatile memory;

a variable length compression unit for variable length compression of image data;

a memory device control unit for storing variable length compression data compressed by the variable length compression unit, and reading out the variable length compression data stored in the non-volatile memory in accordance with a print command;

a decoding unit for variable length expansion of variable length compression data for output to a printer; and a buffer control unit for storing the variable length compression data read from the non-volatile memory, reading out the data stored in a page buffer memory in accordance with a print command, and outputting the read out data to the decoding unit when the data are variable length compression data, and outputting the read out data to a printer when the data are not variable length compression data.

2. The image processing device in claim 1, wherein the buffer control unit outputs the read out data to the printer and the variable length compression unit when the read out data are not variable length compression data and the print command is a print command for a plurality of copies.

3. The image processing device in claim 1 further comprising:

a fixed length compression unit for sequentially cutting out blocks of a predetermined number of pixels from input image data, and compressing the blocks to a fixed length code that is editable in the compressed state, and outputting the code data to a page buffer memory for storage.

4. The image processing device in claim 1 further comprising:

an edit processing unit for editing the input image data and outputting the edited data to the page buffer memory.

5. The image processing device in claim 1, wherein the non-volatile memory device is a hard disk.

6. The image processing device in claim 3 further comprising:

an edit processing unit for editing the fixed length code data compressed by the fixed length compression unit, and outputting the edited data to the page buffer memory.

7. An image processing apparatus comprising:

a reception unit for receiving image data;

a first compression unit for performing a first compression of received image data;

an editing unit for editing based on the first compression data compressed by the first compression unit;

a buffer memory for storing the edited first compression data;

a first output unit for outputting to a printer unit the first compression data output from the buffer memory;

a second compression unit for performing a second compression on the first compression data output from the buffer memory;

a hard disk for storing the second compression data compressed by the second compression unit;

a second output unit for outputting the second compression data from the hard disk to the buffer memory; and an expansion unit for expanding the second compression data output from the buffer memory and outputting the expanded data to the printer unit, wherein the first compression unit is a fixed length compression unit.

8. An image processing apparatus comprising:

a reception unit for receiving image data;

a first compression unit for performing a first compression of received image data;

an editing unit for editing based on the first compression data compressed by the first compression unit;

a buffer memory for storing the edited first compression data;

a first output unit for outputting to a printer unit the first compression data output from the buffer memory;

a second compression unit for performing a second compression on the first compression data output from the buffer memory;

a hard disk for storing the second compression data compressed by the second compression unit;

a second output unit for outputting the second compression data from the hard disk to the buffer memory; and an expansion unit for expanding the second compression data output from the buffer memory and outputting the expanded data to the printer unit, wherein the second compression unit is a variable length compression unit.

* * * * *